US011975490B2

(12) United States Patent
Smith

(10) Patent No.: US 11,975,490 B2
(45) Date of Patent: May 7, 2024

(54) ADDITIVE MANUFACTURING OBSTACLE PART

(71) Applicant: Raytheon Company, Waltham, MA (US)

(72) Inventor: Lisa M. Smith, Plano, TX (US)

(73) Assignee: RAYTHEON COMPANY, Waltham, MA (US)

(*) Notice: Subject to any disclaimer, the term of this patent is extended or adjusted under 35 U.S.C. 154(b) by 430 days.

(21) Appl. No.: 17/317,834

(22) Filed: May 11, 2021

(65) Prior Publication Data

US 2022/0363003 A1    Nov. 17, 2022

(51) Int. Cl.
| | |
|---|---|
| B29C 64/386 | (2017.01) |
| B33Y 50/00 | (2015.01) |
| B33Y 80/00 | (2015.01) |
| G01B 21/30 | (2006.01) |
| G01N 3/08 | (2006.01) |

(52) U.S. Cl.
CPC ............ B29C 64/386 (2017.08); B33Y 50/00 (2014.12); B33Y 80/00 (2014.12); G01B 21/30 (2013.01); G01N 3/08 (2013.01); *G01N 2203/0017* (2013.01)

(58) Field of Classification Search
CPC ......... B33Y 40/00; B33Y 40/20; B33Y 50/00; B33Y 80/00; B29C 64/386; G01B 21/30; G01N 3/08; G01N 2203/0017; B01N 2203/0017
See application file for complete search history.

(56) References Cited

U.S. PATENT DOCUMENTS

| | | |
|---|---|---|
| 10,268,182 B2 | 4/2019 | Salem et al. |
| 10,473,552 B1 | 11/2019 | Leathe et al. |

(Continued)

FOREIGN PATENT DOCUMENTS

JP    2019-519760 A    7/2019

OTHER PUBLICATIONS

Taylor et al., "Toward a common laser powder bed fusion qualification test artifact" Additive Manufacturing 39 (2021). Available online Dec. 31, 2020. <https://www.sciencedirect.com/science/article/pii/S2214860420311751> (Year: 2020).*

(Continued)

*Primary Examiner* — Jonathan M Dunlap
(74) *Attorney, Agent, or Firm* — CANTOR COLBURN LLP

(57) ABSTRACT

An additive manufacturing obstacle part can comprise a base structure comprising at least one external obstacle, and at least one internal obstacle that is formed at least partially within the base structure. The at least one internal obstacle can comprise an elongated internal obstacle extending through the base structure between an inlet and an outlet formed in the base structure. The elongated internal obstacle can comprise at least one wall extending along a nonlinear path. The non-linear path can hinder travel of excess material from an additive manufacturing process along a linear path between the inlet and outlet. This can help a designer to assess an additive manufacturers ability to cleanly produce an internal feature to specifications while removing excess material resulting from the additive manufacturing process.

20 Claims, 8 Drawing Sheets

(56) References Cited

U.S. PATENT DOCUMENTS

| | | | |
|---|---|---|---|
| 10,589,467 | B2 | 3/2020 | Tobia et al. |
| 10,656,623 | B2 | 5/2020 | Capobianco, Jr. |
| 2019/0118481 | A1 | 4/2019 | Brown |
| 2022/0004173 | A1* | 1/2022 | Taylor .................... B22F 10/28 |
| 2022/0297248 | A1* | 9/2022 | Mayberry ................. B22F 5/04 |

OTHER PUBLICATIONS

Moshiri et al., "Benchmarking of Laser Powder Bed Fusion Machines" Journal of Manufacturing and Materials Processing, Oct. 1, 2019. <https://www.mdpi.com/2504-4494/3/4/85> (Year: 2019).*

Davies, "Inside Origin One: innovation, collaboration and thermo polymerisation" 3D Printing & Additive Manufacturing Intelligence, TCT Magazine May 28, 2019 <https://www.tctmagazine.com/additive-manufacturing-3d-printing-news/inside-origin-one-innovation-col> (Year: 2019).*

Vorkapic et al. "An additive manufacturing benchmark artifact and deviation measurement method" Journal of Mechanical Science and Technology 34, 3015-3026, Jul. 8, 2020 <https://link.springer.com/article/10.1007/s12206-020-0633-2> (Year: 2020).*

Kolb et al. "Qualification of channels produced by laser powder bed fusion: Analysis of cleaning methods, flow rate and melt pool monitoring data" Additive Manufacturing, vol. 25, Jan. 2019. Available online Nov. 26, 2018 <https://www.sciencedirect.com/science/article/pii/S221486041830294X> (Year: 2018).*

Kruth et al. "Benchmarking of different SLS/SLM processes as rapid manufacturing techniques" Int. Conf. Polymers & Moulds Innovations (PMI) Apr. 20-23, 2005 <https://ris.utwente.nl/ws/portalfiles/portal/5676701/Wa1021.pdf> (Year: 2005).*

Moylan et al., An Additive Manufacturing Test Artifact, Journal of Research of the National Institute of Standards and Technology, Oct. 23, 2014, pp. 429-459, vol. 119, National Institute of Standards and Technology, Gaithersburg, MD.

NIST, NIST Additive Manufacturing Test Artifact, https://www.nist.gov/topics/additive-manufacturing/resources/additive-mannfacturing-test-artifact, Oct. 19, 2017, 3 pages, National Institute of Standards and Technology, Gaithersburg, MD.

* cited by examiner

ADDITIVE MANUFACTURING OBSTACLE PART

BACKGROUND

Additive manufacturing, also known as three-dimensional or 3D printing, is becoming more and more common. An additive manufacturing process can be generally described as a method of fabricating a part in successive layers. Examples of additive manufacturing processes include laying down or printing material layer by layer to form a part, or binding or sintering a manufacturing material, such as a material powder, in successive layers to form a part.

Accordingly, there are many different types of additive manufacturing processes. Furthermore, different additive manufacturers can have different abilities to achieve desired specifications for a part, such as dimensional tolerances or desired material properties. Outcomes of additive manufacturing processes can also depend on the type of materials used in a given additive manufacturing process. Therefore, for those requiring the services of an additive manufacturer, such as a designer, it is important to be able to understand the abilities of different additive manufacturers so that the designer can objectively choose an appropriate additive manufacturer for a specific application. It is also important for the designer to understand the design or tolerance limits that can be expected from an additive manufacturing process from a given additive manufacturer.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
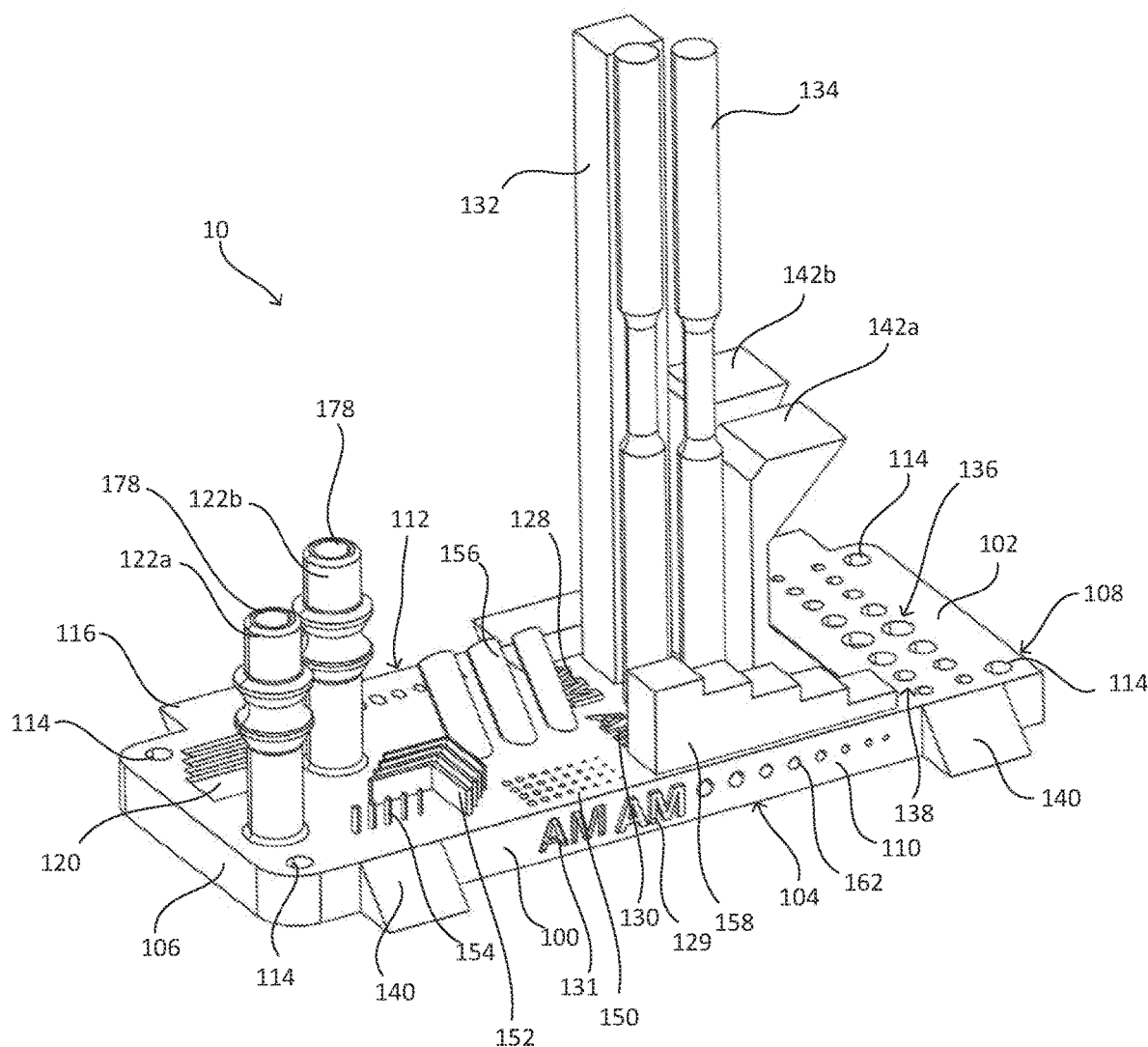
FIG. 1A is a top, front, right isometric view of an additive manufacturing obstacle part according to one example.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is an additive manufacturing obstacle part designed to test an additive manufacturer's ability to build parts with various features to a given set of specifications. The additive manufacturing obstacle part can have specifications set forth in a template (e.g. a set of instructions, drawings, models etc.) which the additive manufacturer can use to fabricate the obstacle part. The fabricated additive manufacturing obstacle part can be tested and measured to obtain the specifications for the fabricated additive manufacturing obstacle part. The specification for the fabricated additive manufacturing obstacle part can be compared the specifications set forth in the template of the additive manufacturing obstacle part to determine the ability of an additive manufacturer to conform to the template specifications. Based on this, a designer can understand design tolerances and constraints for parts built by a given additive manufacturer, and can objectively and efficiently choose an additive manufacturer with the correct abilities to manufacture desired features for a part.

As set forth herein an example of an additive manufacturing obstacle part can comprise a base structure comprising at least one external obstacle, and at least one internal obstacle that is formed at least partially within the base structure. The at least one internal obstacle can comprise an elongated internal obstacle extending through the base structure between an inlet and an outlet formed in the base structure. The elongated internal obstacle can comprise at least one wall extending along a nonlinear path. The nonlinear path can hinder travel of excess material from an additive manufacturing process along a linear path between the inlet and outlet. This can help a designer to assess an additive manufacturer's ability to cleanly produce an internal feature to specifications while removing excess material resulting from the additive manufacturing process.

In one example, the elongated internal obstacle can comprise an elongated channel with straight portions and at least one turn. The at least one turn can comprise a forty-five degree turn and a ninety degree turn. The at least one turn can also comprise a horizontal turn and a vertical turn.

In some instances, the at least one turn forms a U-turn in the elongated channel. The elongated internal obstacle can further comprise at least one bypass connecting the internal channel on each side of the U-turn.

In some examples, the at least one external obstacle can comprise projecting port holes formed on a top side of the base structure. The projecting port holes can comprise the inlet and the outlet of the elongated internal obstacle, respectively. The straight portions of the elongated internal obstacle can comprise vertical straight portions disposed within the projecting port holes and horizontal straight portions disposed within the base structure.

In one example, the at least one external obstacle can comprise an overhang that is cantilevered from a side of the base structure. The at least one external obstacle can also comprise a material coupon that facilitates material property testing of the additive manufacturing obstacle part.

In some examples, the at least one external obstacle can comprise an array of through holes extending from a top side to a bottom side. The array of through holes can comprise different standard drill holes thread diameters. The at least one external obstacle can also comprise an array of blind holes extending from the top side into the base structure. The array of blind holes can comprise different standard thread diameters.

In some examples, the at least one external obstacle can comprise a surface finish obstacle comprising at least one inclined surface and a vertical surface. The at least one inclined surface and the at least one vertical surface can facilitate surface finish testing at different angles on the additive manufacturing obstacle part.

In some examples, the at least one external obstacle can comprise external vertical printing protruding from a side of the base structure, and external horizontal printing protruding from a top of the base structure. The at least one external obstacle can comprise internal vertical printing formed into the side of the base structure, and internal horizontal printing formed into the top of the base structure.

In some examples, the at least one external obstacle can comprise thin wall obstacles formed onto a top of the base structure. The thin wall obstacles can comprise different thicknesses. The at least one internal obstacle can comprise an array of vertical holes formed in a side of the base structure. Each of the vertical holes can comprise a different depth and a different diameter.

In one example, a method for testing capabilities of an additive manufacturer is provided. The method can comprise providing a template of an additive manufacturing obstacle part to the additive manufacturer for fabrication. The additive manufacturing obstacle template can be configured to facilitate production of an additive manufacturing obstacle part comprising an elongated internal obstacle extending between an inlet and an outlet. The elongated internal obstacle can comprise at least one wall extending along a nonlinear path. The method can further comprise receiving a fabricated additive manufacturing obstacle part from the additive manufacturer based on the template, and evaluating the fabricated additive manufacturing obstacle part against the template of the additive manufacturing obstacle part. This can be done by comparing one or more specifications of the fabricated additive manufacturing obstacle part with one or more specifications of the template of the additive manufacturing obstacle part. The method can further comprise measuring an amount of excess material remaining in the elongated internal obstacle to determine the additive manufacturers ability to remove the excess material from internal features.

In some examples, the method can comprising measuring surface finish of at least a portion of the fabricated obstacle part. The method can also comprise measuring one or more of thermal conductivity, outgassing, coefficient of thermal expansion, specific heat, density, and microstructure of at least a portion of the fabricated obstacle part. The method can also comprise measuring tensile strength of at least a portion of the fabricated obstacle part.

In some examples, an additive manufacturing obstacle part is provided and comprises a base structure comprising at least one external obstacle, and at least one internal obstacle that is formed at least partially within the base structure. The at least one internal obstacle can comprise an elongated internal obstacle extending through the base structure between an inlet and an outlet, such as those formed in the base structure. The elongated internal obstacle can comprise an elongated channel with one or more horizontal straight portions, one or more vertical straight portions, various bends or turns, such as forty-five degree bends or turns, ninety degree turns, horizontal turns, and vertical turns. The elongated internal obstacle can comprises at least one bypass connecting the two or more sections of the elongated internal obstacle.

The at least one external obstacle can comprise projecting port holes formed on a top side of the base structure. The projecting port holes can comprise the inlet and the outlet of the elongated internal obstacle, respectively. The vertical straight portions can be disposed within the projecting port holes. The horizontal straight portions, the vertical straight portions, the forty-five degree turns, the ninety degree turns, the horizontal turns, the vertical turns, the bypass and any other internal configurations can be operable to hinder travel of excess material from an additive manufacturing process along a linear path between the inlet and outlet.

Figure 1B:
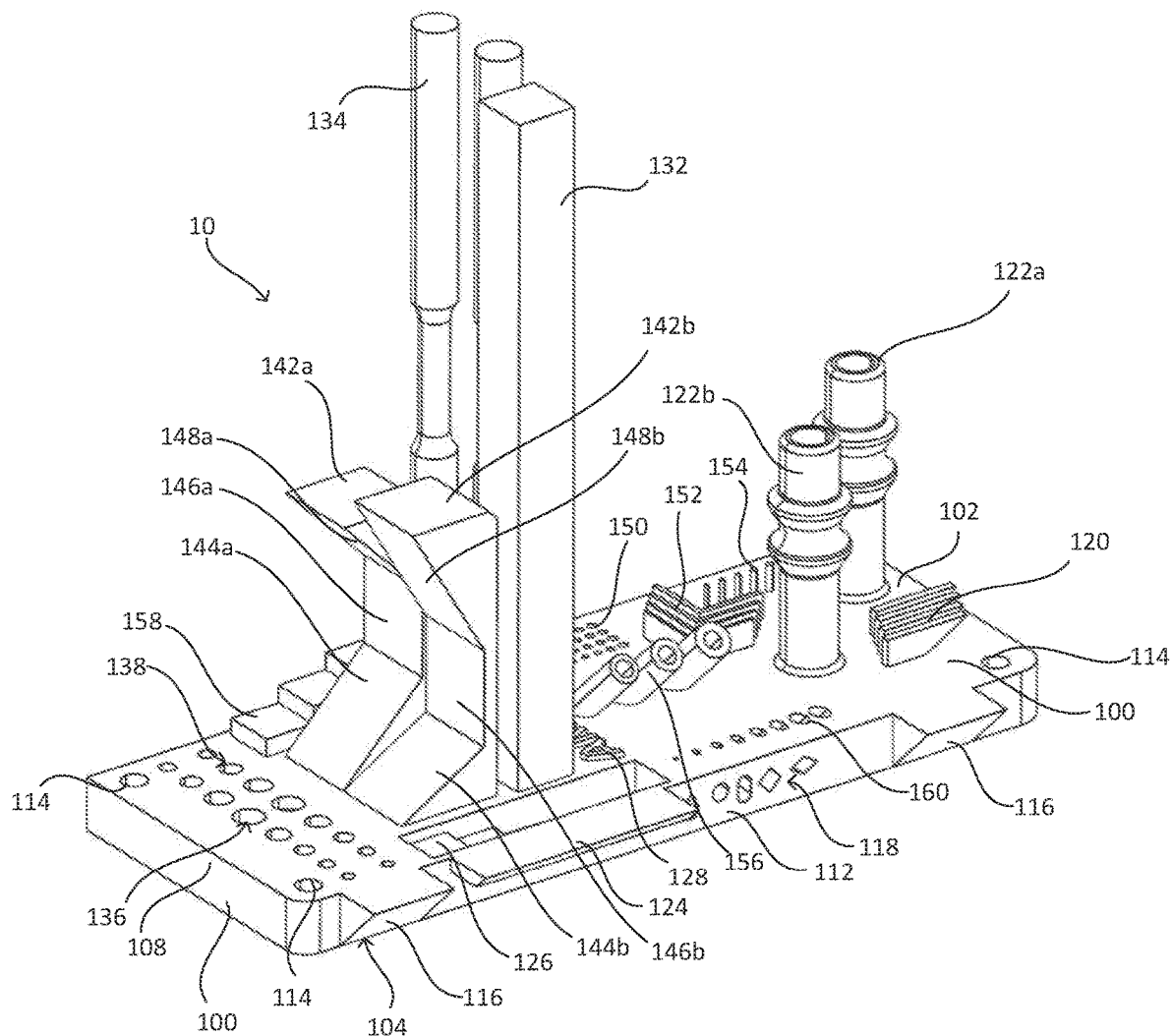
FIG. 1B is a top, rear, left isometric view of the additive manufacturing obstacle part of FIG. 1A.
Figure 1C:
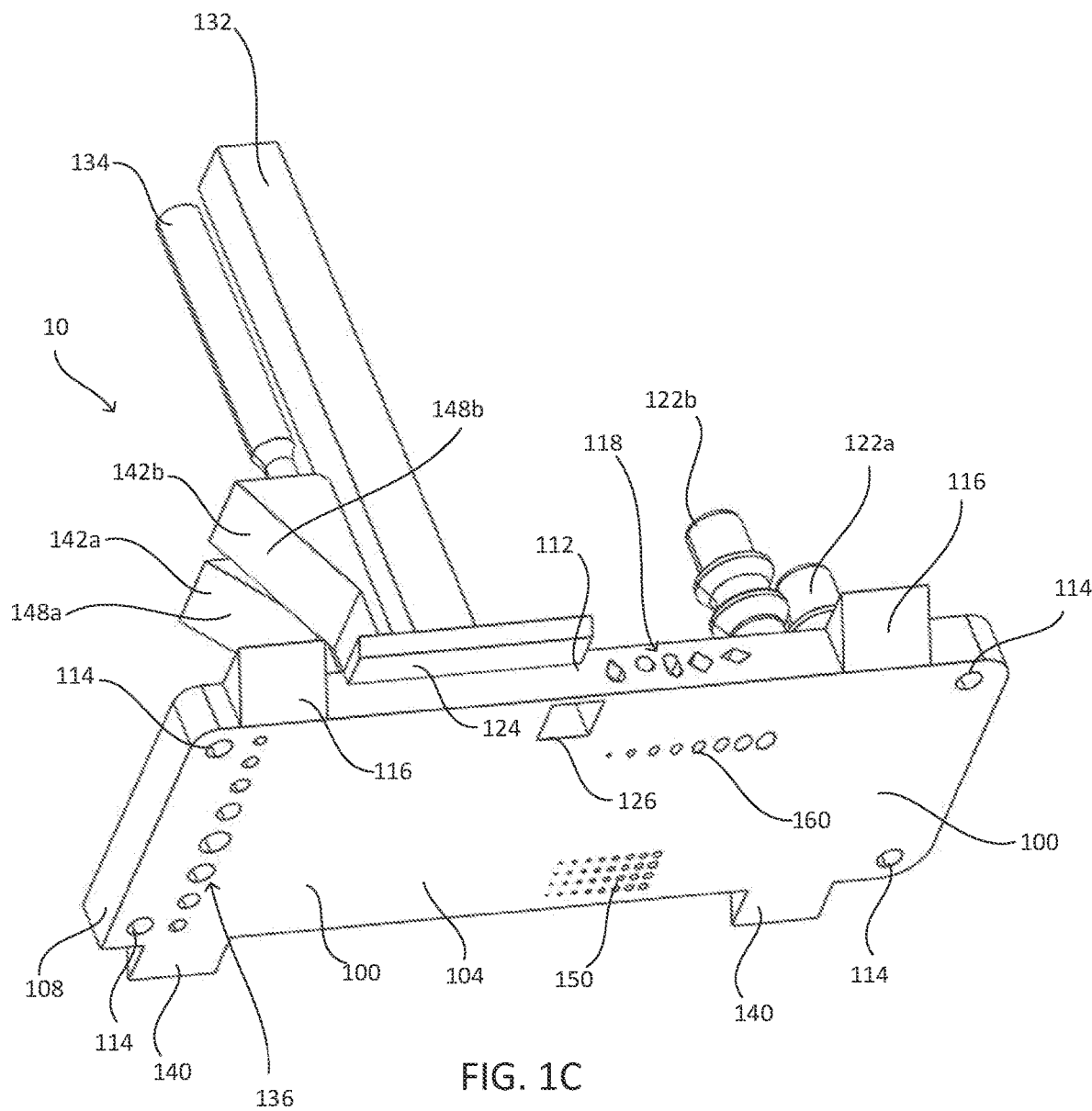
FIG. 1C is a bottom, rear, left isometric view of the additive manufacturing obstacle part of FIG. 1A.
Figure 1D:
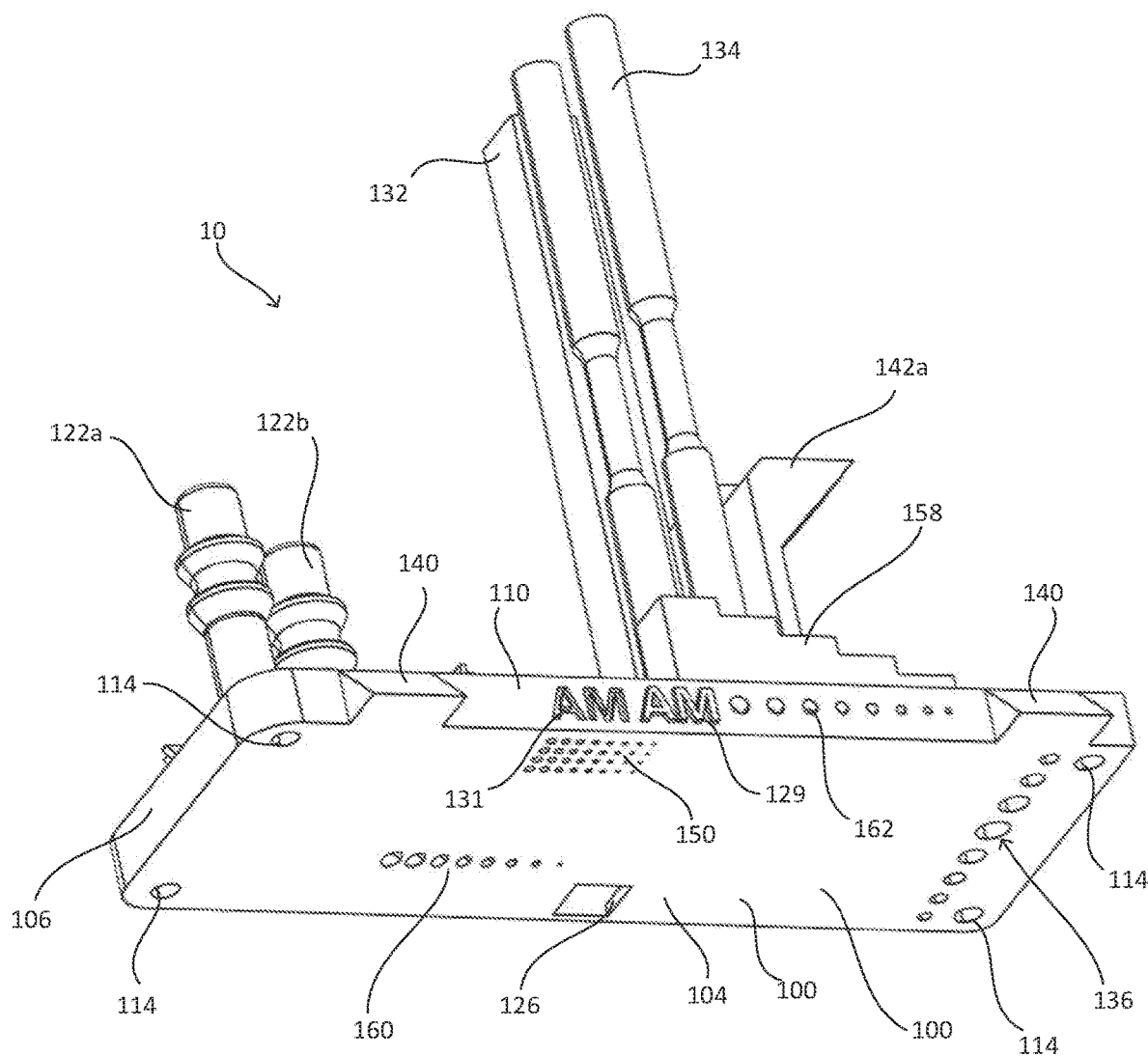
FIG. 1D is a bottom, front, right isometric view of the additive manufacturing obstacle part of FIG. 1A.

To further describe the present technology, examples are now provided with reference to the figures. With reference to FIGS. 1A-1D, an additive manufacturing obstacle part 10 is provided. The additive manufacturing obstacle part 10 facilitates comparison of different additive manufacturers (three-dimensional printers) to determine or assess the abilities of the different additive manufacturers and their respective additive manufacturing machines to produce the various obstacles set forth on the additive manufacturing obstacle part 10. The additive manufacturing obstacle part 10 further facilitates a designer to understand design tolerances and material properties that can be achieved using a given additive manufacturer.

The obstacles or obstacle features of the additive manufacturing obstacle part 10 can be set forth in a template that can be sent to one or more additive manufacturers. The template can comprise any set of manufacturing instructions with specifications to build the additive manufacturing obstacle part 10. For example, the template can comprise computer-aided or physical engineering drawings, virtual or physical three-dimensional models, written instructions, computer-generated code or the like that are based on the additive manufacturing obstacle part 10 attempted to be built by the manufacturer. The specifications provided in the template can comprise dimensions, surface finishes, and/or material properties of the various obstacles of the additive manufacturing obstacle part 10.

The template can be sent to multiple manufacturers. Each manufacturer receiving the template can attempt to build the additive manufacturing obstacle part 10. The built additive manufacturing obstacle parts from the various manufacturers can then be tested and evaluated (e.g. through measurements and observations of the built additive manufacturing obstacle parts obtained by non-destructive testing or destructive testing as is known in the art) to determine resulting specifications and capabilities. The specifications of the built additive manufacturing obstacle parts can then be compared to the specifications called out in the template of the additive manufacturing obstacle part 10 to determine to what degree the specifications of the built obstacle parts conform (or do not conform) with the specifications of the template of the additive manufacturing obstacle part 10. A person choosing to manufacture items from an additive manufacturer can therefore choose the additive manufacturer that builds the additive manufacturing obstacle part having specifications closest to (i.e., that best match) those set forth in the template. Further, a designer using a given additive manufacturer can understand design constraints associated with parts built by the additive manufacturer.

The additive manufacturing obstacle part 10 can comprise a base structure 100 onto which the various obstacles are to be formed. In the figures, the base structure 100 is shown to have a substantially rectangular shape with some of the corners being rounded. Of course, the base structure 100 can take on any variety of shapes and is not limited to a rounded rectangular shape. The base structure 100 can comprise a variety of obstacles including internal obstacles formed into the base structure 100 and external obstacles which are built up onto, or which project from, the base structure 100. In one example, the corners of the base structure 100 can comprise different sizes, shapes, and configurations, such as to facilitate an understanding of how sharp a corner the manufacturer's additive manufacturing machine can produce, whether the additive manufacturing machine can produce different external radii, and other specified features or obstacles.

Each of the obstacles of the base structure 100 can help determine an additive manufacturer's ability to conform to the specifications of the additive manufacturing obstacle part 10. Some obstacles can focus on the ability to achieve given dimensions of an obstacle to within predetermined tolerances, such as height, width, depth, diameter, thickness, etc. Other obstacles can focus on the ability to build features that are oriented vertically, horizontally, or at an angle relative to the base structure 100 of the additive manufacturing obstacle part 10. Still other obstacles can focus on the ability to achieve predetermined material properties set forth in the specifications of the additive manufacturing obstacle part 10. Further, obstacles can focus on the ability to remove excess material used during an additive manufacturing process from a finished feature of the additive manufacturing obstacle part 10. Some obstacles can focus on more than one of the above abilities simultaneously.

Each of the obstacles of the additive manufacturing obstacle part 10 will be described below. The obstacles are designed to compactly and efficiently test multiple abilities or capabilities of different additive manufacturers and their respective additive manufacturing machines simultaneously. This allows a person to evaluate the abilities or capabilities of the different additive manufacturers in a consistent, efficient, and objective manner. While the placement of the obstacles described below can allow all of the obstacles to compactly fit on the base structure 100, other arrangements of the obstacles are possible, and the specific arrangement described herein is not intended to be limiting in any way. Further, the additive manufacturing obstacle part 10 can include one, some, or all of the obstacles described below as desired.

The base structure 100 of the additive manufacturing obstacle part can comprise a top side 102, a bottom side 104, a first end 106, a second end 108 opposite the first end 106, a first side 110, and a second side 112 opposite the first side, as shown in the figures. Each of the top side 102, bottom side 104, first end 106, second end 108, first side 110, and second side 112 are substantially planar in this example. However, other surfaces contours, configurations, and finishes are contemplated and could also be incorporated. Mounting holes 114 can extend from the top side 102 through to the bottom side 104 of the base structure 100 adjacent to corners of the base structure 100. The mounting holes 114 can be optional and are provided to facilitate mounting or holding of the base structure 100 during a manufacturing and/or testing process.

The base structure 100 can comprise one or more overhang obstacles 116. These can be formed to comprise at least one angled or inclined side or surface. In this example, two overhang obstacles 116 protrude from the second side 112 of the base structure 100, and each comprise a side or surface formed on an angle or incline of forty-five degrees. Although two overhang obstacles 116 are shown, any number can used in any desired placement as is the case for all of the obstacles on the base structure 100, as described above. The overhang obstacles 116 are formed such that a top side extends from and is flush with the top side 102 of the base structure 100, with the angled side extending up from the bottom side 104, converging with the top side of the overhang obstacle, thus forming a fine edge. The overhang obstacles 116 function to test an additive manufacturer's ability to build up a cantilevered feature at a certain angle or degree; in this case 45 degrees. The overhang obstacles 116 further function to test an additive manufacturer's ability to create a fine edge that does not warp during or after the additive manufacturing process.

The base structure 100 can also comprise an array of internal, vertically shaped obstacles 118. The array of internal, vertically shaped obstacles 118 in this example is formed in the second side 112 of the base structure 100. The array of internal; vertically shaped obstacles 118 can comprise a variety of cross-sectional shapes, such as teardrop, triangular, circular, elongated oval, square, diamond, or the like. The array of internal, vertically shaped obstacles 118 are formed internally into the base structure 100 as voids that extend inward from the second side 112 into the base structure 100. The array of internal, vertically shaped obstacles 118 tests an additive manufacturers ability to vertically form the various internal shapes at specified dimensions.

Angled thin wall obstacles 120 can also be provided on the top side 102 of the base structure 100. In this example, the angled thin wall obstacles 120 are formed near the first end 106 of the base structure 100. The angled thin wall obstacles 120 can include any desired number of angled thin wall obstacles 120, some of which can be formed at different thicknesses. The angled thin wall obstacles 120 each include an overhanging section, namely a section out of contact with the base structure 100, and that extends outward and upward from the top side 102 of the base section 100 and the portion of the angled thin wall obstacles 120 in contact with the base section 100. The angled thin wall obstacles 120 test an additive manufacturer's ability to build vertical thin features at various thicknesses, and to do so while incorporating a cantilevered, overhanging section of the thin features.

The base structure 100 can further comprise a first projecting port hole 122a and a second projecting port hole 122b. The port holes 122a,b can be formed on the top side 102 of the base structure 100 to extend upward from the top side 102 of the base structure 100. In this example, the port holes 122a,b are formed offset from one another, but this is not to be limiting. That is, the first port hole 122a is formed closer to the first end 106 and the first side 110 of the base structure 100 than the second port hole 122b. The first and second port holes 122a,b can be formed with a substantially or generally cylindrical shape as shown. The first and second port holes 122a,b can also include annular features where an outer diameter of the port holes 122b changes over the length of the port holes 122a,b. This tests an ability of an additive manufacturer to form vertical features at specified dimensions, wherein the vertical features comprise a bore or port having an opening. Further, the port holes 122a,b can be configured to be in fluid communication with an elongated internal obstacle, which will be described in more detail below.

The base structure 100 can further comprise an overhang obstacle 124. The overhang obstacle 124 can be formed to comprise a side or surface flush with the top side 102 of the base structure 100, and to extend from the second side 112 of the base structure 100. The overhang obstacle 124 can thus be formed as a cantilevered feature from the second side 112 of the base structure 124. The overhang obstacle 124 can test an additive manufacturer's ability to create overhanging, cantilevered features to specification. For example, in some additive manufacturing processes, various supports can be utilized to support cantilevered features during the manufacturing process, which are then removed after completion of the manufacturing process. In this example, the overhang obstacle 124 tests the additive manufacturer's ability to cleanly create the cantilevered feature to predetermined specifications without the use of supports.

Another obstacle formed on the base structure 100 can be an internal step-down obstacle 126. The internal step-down obstacle 126 can be formed into the top side 102 of the base structure. In this example, the internal step-down obstacle 126 can be formed adjacent to the second side 112 and adjacent to the overhang obstacle 124. The internal step-down obstacle 126 is formed to create a number of "stairs" into the base structure, with the final stair leading to an opening formed in the bottom side 104. This internal step-down obstacle 126 can test an additive manufacturer's ability to create internal horizontal and vertical surfaces of a predetermined specification, and to create edges formed internally in the base structure 100.

The base structure 100 can further comprise external horizontal text printing 128 and external vertical text printing 129. The external horizontal text printing 128 is formed to protrude out of the top side 102 of the base structure, and the external vertical text printing 129 is similarly formed to protrude out of the first side 110 of the base structure 100. In this example, the external horizontal text printing 128 is formed centrally on the top side 102 of the base structure 100, and the external vertical text printing 129 is formed centrally on the first side 110 of the base structure.

Similarly, the base structure 100 can include an internal horizontal text printing 130 formed on the top side 102 of the base structure 100 and an internal vertical text printing 131 formed of the first side 110 of the base structure 100. In this example, the internal horizontal text printing 130 can be formed adjacent to the external horizontal text printing 128, and the internal vertical text printing 131 can be formed adjacent to the external vertical text printing 129. The internal and external printings 128, 129, 130, 131 in this example form the letters "AM," however any letters could be used, and the letters "AM" are merely exemplary. The internal and external text printings 128, 129, 130, 131 can test an additive manufacturer's capability to form text printings into or protruding from a base structure to a given specification.

A variety of material coupons can be formed onto the base structure 100 which can be used to test material properties of the additive manufacturing obstacle part 10. A first material coupon 132 can be provided that extends upwards from the top side 102 of the base structure 100. In this example, the first material coupon 132 is formed adjacent to the external horizontal printing 128 and the internal step-down feature 126. However, the first material coupon 132 could be formed elsewhere on the base structure 100. Additionally, multiple first material coupons 132 could be formed to facilitate more material testing as desired.

The first material coupon 132 is formed to be relatively tall in comparison to other features and obstacles of the base structure 100. The first material coupon 132 can be configured to be separated from the base structure 100 to be used for material testing. In this example, the first material coupon 132 can be utilized to test various material properties such as thermal conductivity, outgassing, a coefficient of thermal expansion, specific heat, density, microstructure, etc.

One or more second material coupons 134 can also be provided. In this example, two second material coupons 134 are formed on and extend upwards from the top side 102 of the base structure 100. In this example, the second material coupons 134 are formed adjacent to the first material coupon 132. The second material coupons 134 can be used for further material testing. In this example; the second material coupons 132 are shaped to facilitate material strength testing such as tensile testing.

The base structure 100 can further comprise an array of through holes 136 that extend from the top side 102 of the base structure 100 to the bottom side 104 of the base structure 100. In this example, the array of through holes 136 is formed near the second end 108 of the base structure 100, and the array of through holes 136 extends linearly from the first side 110 to the second side 112. This particular location is not intended to be limiting in any way as through holes 136 can be formed anywhere in the base structure 100, The array of through holes 136 can comprise through holes of various diameters. For example, the diameters can be standard thread diameters for a tapped hole or a helical insert such as #2, #4, #6, #8, etc. The array of through holes 136 can test an additive manufacturer's capability to produce through holes at predetermined specifications.

The base structure 100 can further comprise an array of blind holes 138 that extend from the top side 102 into the base structure 100 to desired depths. In this example, the array of blind holes 138 is formed adjacent to the array of through holes 136, and the array of blind holes 138 extends linearly from the first side 110 to the second side 112. This particular location is not intended to be limiting in any way as blind holes 138 can be formed anywhere in the base structure 100. The array of blind holes 136 can comprise blind holes of various diameters. For example, the diameters may be standard thread diameters for a tapped hole or a helical insert such as #2, #4, #6, #8, etc. The array of blind holes 138 can test an additive manufacturer's capability to produce blind holes at predetermined specifications.

Sloping obstacles 140 can also be provided on the base structure 100. In this example, two sloping obstacles 140 can extend from the first side 110 near the first end 106 and the second end 108, respectively. The sloping obstacles 140 slope down from the top side 102 and are formed flush with a bottom side 104, forming a fine edge. In this example, the angle of the slope is forty-five degrees, but this is not intended to be limiting in any way. The sloping obstacles 140 can test an additive manufacturer's ability to create a fine edge without warping.

Surface finish obstacles facilitating the measurement of the surface finish at various angles can also be provided on the base structure 100. In this example a first surface finish obstacle 142a and a second surface finish obstacle 142b can be provided on the top side 102 of the base structure 100 between the array of blind holes 138 and the first and second material coupons 132, 134. The first and second surface finish obstacles 142a,b comprise a variety of surfaces including horizontal, vertical, and various angled surfaces that facilitate the testing of an additive manufacturer's ability to create the obstacles at a specified surface finish.

The first surface finish obstacle 142a can comprise a first inclined surface 144a, a vertical surface 146a, and a second inclined surface 148a, Similarly, the second surface finish obstacle 142b can comprise a first inclined surface 144b, a vertical surface 146b, and a second inclined surface 148b. In this example, the first inclined surface 144a of the first surface finish obstacle 142a is sloped at a different angle than the first inclined surface 144b of the second surface finish obstacle 142b, Similarly, the second inclined surface 148a of the first surface finish obstacle 142a is sloped at a different angle than the second inclined surface 148b of the second surface finish obstacle 142b. In this manner, multiple inclined angles can be tested for surface finish using the additive manufacturing obstacle part 10.

The base structure 100 can also comprise internal small diameter obstacles 150. The internal small diameter obstacles 150 can be an array of small diameter through holes 150 extending from the top side 102 to the bottom side 104 of the base structure 100. In this example, the internal small diameter obstacles 150 can be formed adjacent to the first side 110 of the base structure 100. The internal small diameter obstacles 150 can test an additive manufacturers ability to create internal small diameter features according to a given specification, and can test the limit of how small of a through hole the additive manufacturer can create.

External thin wall obstacles 152 can also be formed on the base structure 100. In this example, the external thin wall obstacles 152 can be formed adjacent to the internal small diameter obstacles 150. The external thin wall obstacles 152 can be an array of walls extending up from the top side of the base structure 100, each having a thickness and a height, which thicknesses and heights can vary from one wall to the other if desired. The external thin wall obstacles 152 can be formed to have an angle. In the example shown, the external thin wall obstacles 152 comprise a wall structure formed at a ninety degree angle (although this is not intended to be limiting in any way), such that the external thin wall obstacles 152 have a portion extending in a direction from the first end 106 of the base structure 100 toward the second end 108 of the base structure 100, and a portion extending in a direction from the first side 110 toward the second side 112 of the base structure 100. The external thin wall obstacles can test an additive manufacturer's ability to create thin wall features according to a given specification, and can test the limit of how thin a wall the additive manufacturer can create.

The base structure 100 can further comprise fin pin obstacles 154 formed on the top side 102 of the base structure 100. In this example the fin pin obstacles 154 are formed adjacent to the external thin wall obstacles 152 near the first end 106 and the first side 110. The fin pin obstacles 154 can comprise an array of small diameter pins extending up from the top side 102 of the base structure 100. The fin pin obstacles 154 can test an additive manufacturer's ability to create small diameter pins according to a given specification and can test the limit of how thin (e.g., how small a diameter) a pin the additive manufacturer can create.

Angle tubing 156 can also be formed onto the base structure 100. The angle tubing 156 can be formed adjacent to the external and internal horizontal printing 128, 129 on the top side 102 of the base structure 100 in this example. The angle tubing 156 can be configured to slope upward at a given angle, which in this example is forty-five degrees although this is not intended to be limiting in any way. The angle tubing 156 can comprise a substantially hollow cylindrical shape. The tubing wall thickness, the inside diameter, the angle of the tubing, and any other parameter can all be varied as needed or desired. The angle tube 156 can test an additive manufacturer's ability to create hollow cylindrical features oriented at an angle relative to the top side 102 of the base structure 100 at given specifications.

The base structure 100 can further comprise an external step-up obstacle 158 formed on the top side 102 of the base structure 100. The external step-up obstacle 158 in this example is formed adjacent to the first side 110 of the base structure. The external step-up obstacle 158 forms several "stairs" that step up from the top side 102 of the base structure. This tests an additive manufacturer's ability to form horizontal and vertical surfaces at varying heights and thicknesses according to given specifications.

Internal angle holes 160 can also be formed into the base structure 100. In this example, the internal angle holes 160 can be formed on the top side 102 of the base structure 100 adjacent to the second side 112. The angle holes can extend from the top side 102 to the bottom side 104 at an angle (e.g., forty-five degrees), and can include an array of holes each having different diameters. This can test an additive manufacturer's ability to form internal features at an angle relative to the top side 102 and bottom side 104 of the base structure at given specifications.

The base structure 100 can further comprise an array of vertical holes 162. In this example, the array of vertical holes 162 can be formed in the first side 110 of the base structure 100. The array of vertical holes 162 can comprise holes having differing diameters and differing depths. This tests an additive manufacturer's ability to form vertical holes at given specifications.

Figure 2A:
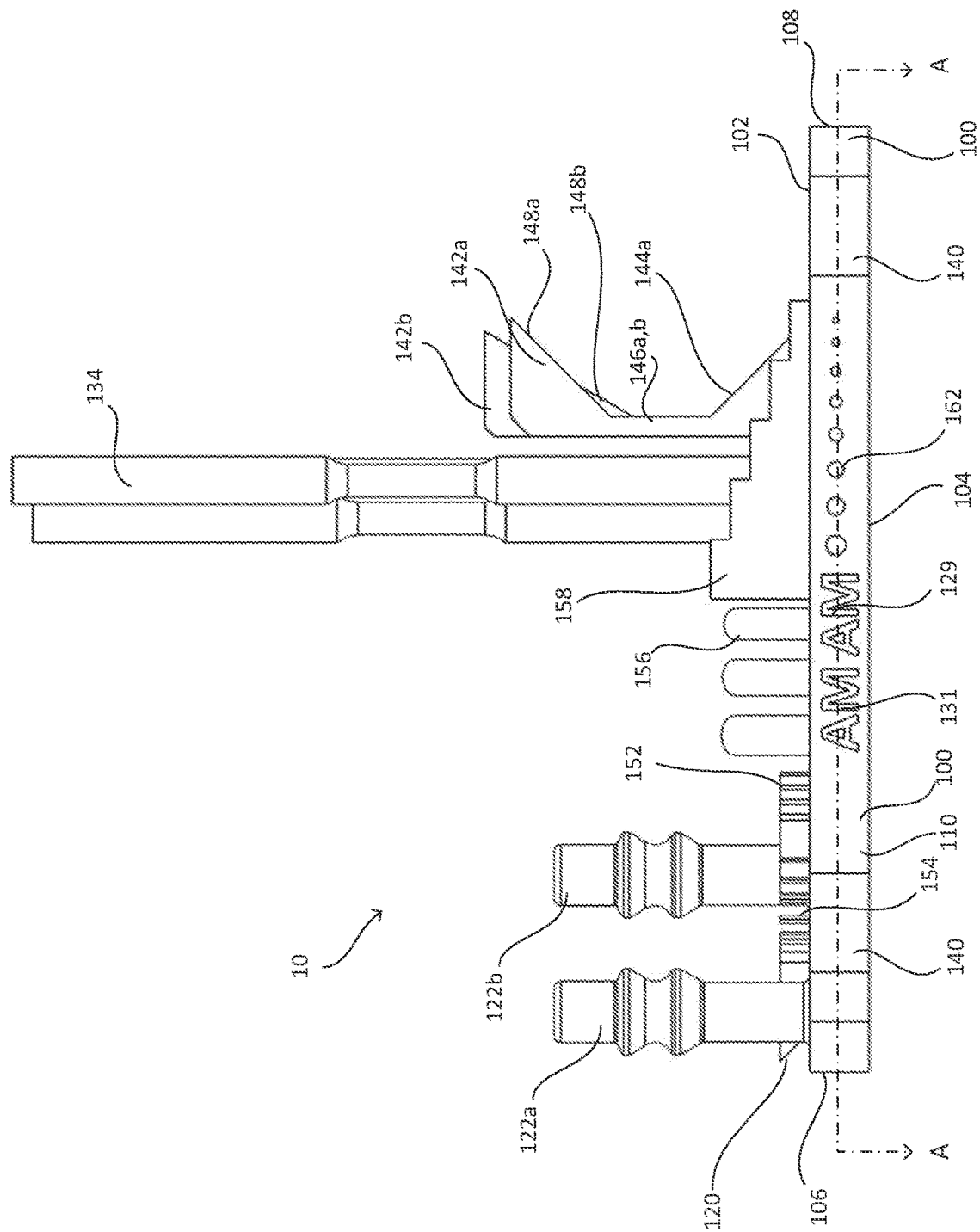
FIG. 2A is a front view of the additive manufacturing obstacle part of FIG. 1A.
Figure 2B:
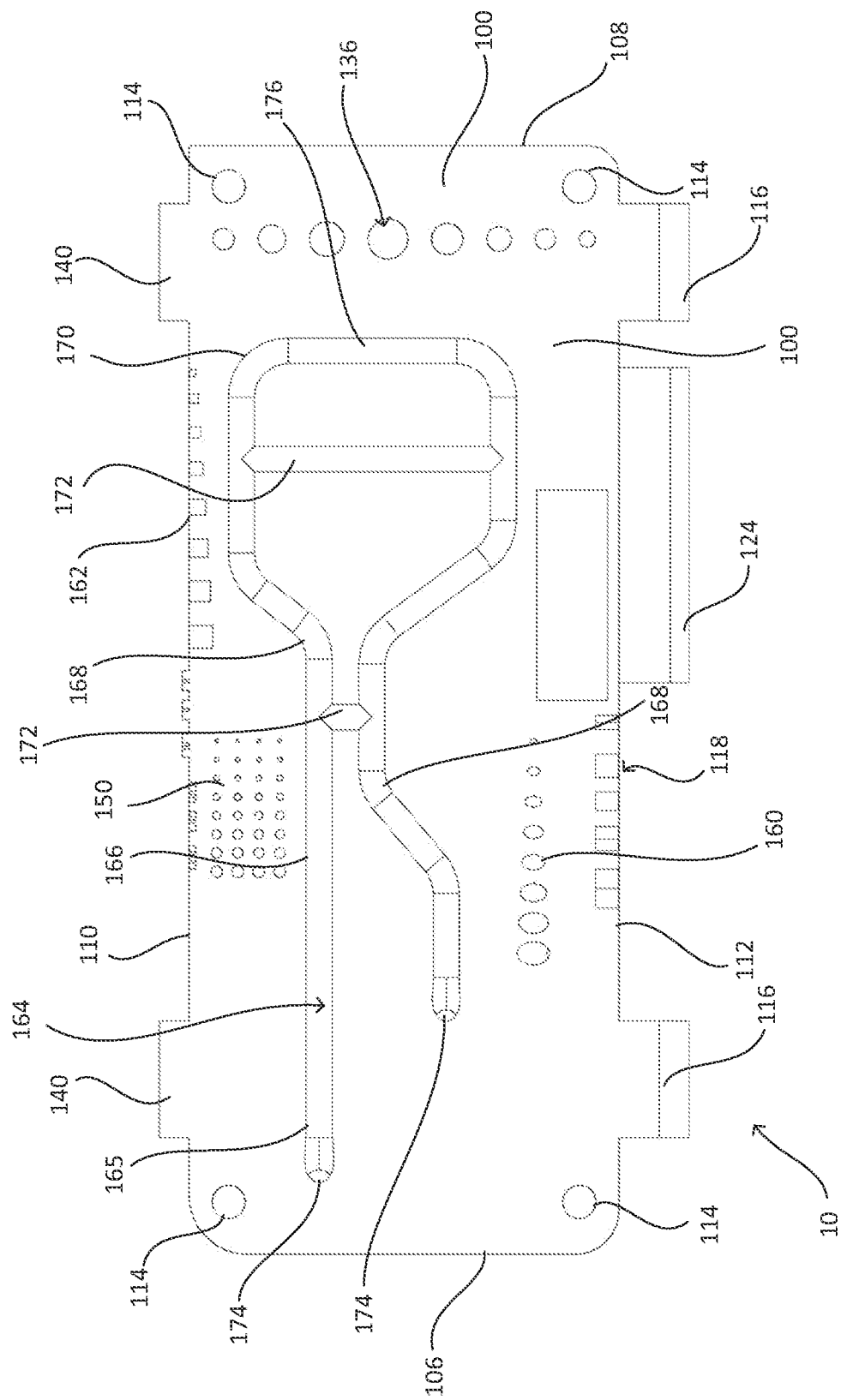
FIG. 2B is a section view taken along the line A-A of FIG. 2A.
Figure 3A:
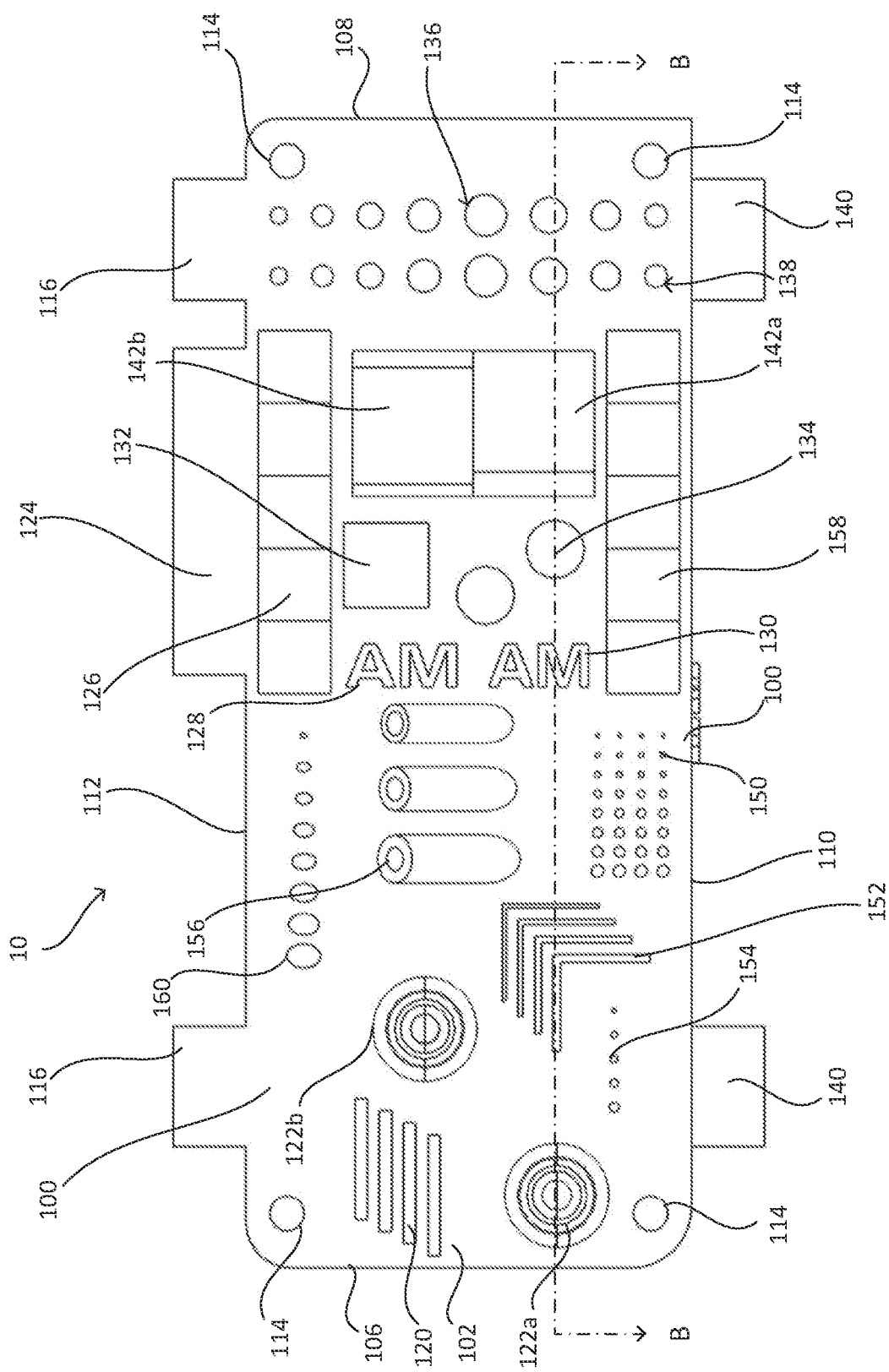
FIG. 3A is a top view of the additive manufacturing obstacle pa FIG. 1A.
Figure 3B:
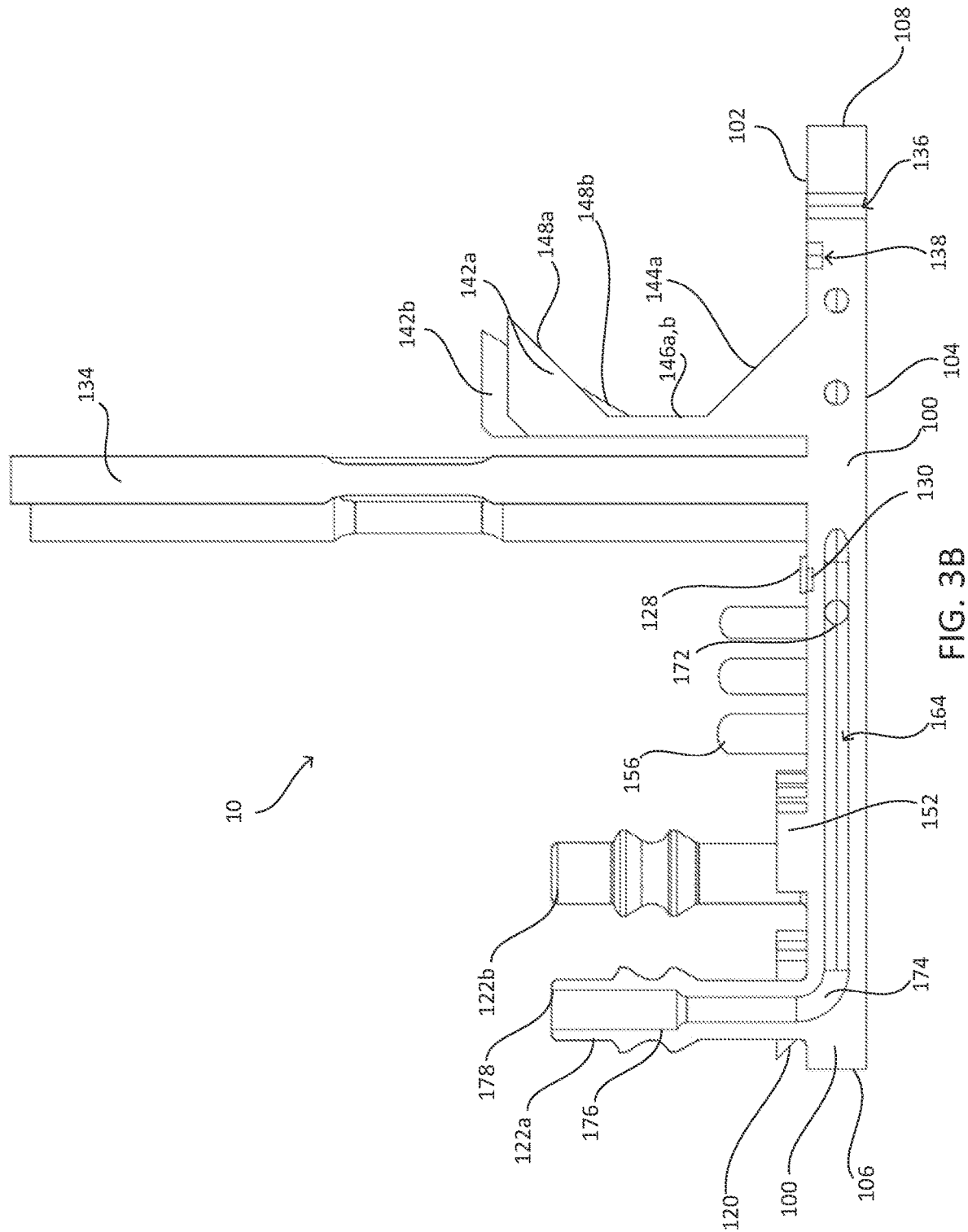
FIG. 3B is a section view taken along the line B-B of FIG. 3A.

Referring now to FIGS. 2A-3B, internal obstacles of the base structure 100 of the additive manufacturing obstacle part will now be described. The base structure 100 can comprise an elongated internal obstacle 164. The elongated internal obstacle 164 in this example is formed internally in the base structure 100 between the top side 102 and the bottom side 104. The elongated internal obstacle 164 can comprise one or more walls (e.g., see wall 165 forming a circular cross-section). Indeed, the elongated internal obstacle 164 could have a cross-section of any desired shape, such as square, rectangular, teardrop, diamond, etc., defining or having multiple walls. In another example, the elongated internal obstacle 164 can also be configured to comprise a lattice, or a plurality of segments, that are not continuously connected (i.e., a plurality of different, segmented elongated internal obstacles). Each of these can be configured to extend between respective inlets and outlets. In the example shown, the wall 165 of the elongated internal obstacle forms a continuous, elongated internal channel having a circular cross-section.

As is the case with any of the alternatively configured elongated internal obstacles contemplated herein, the wall 165 of the elongated internal obstacle 164 can be configured to define and follow a non-linear path as measured between the inlet and the outlet of the elongated internal obstacle 164. The non-linear path of the wall 165 can operate to hinder travel of excess material along a linear path between the inlet and outlet, Indeed, any excess material existing from a fabricated obstacle part based on the template, will encounter either a section of the wall 165 of the elongated internal obstacle 164 as it turns or bends along the length of the elongated internal obstacle 164, or as it encounters an intersection of sections of the elongated internal obstacle 164 (e.g., one created by a bypass channel 172). In this example, the non-linear path of the wall 165 of the elongated internal obstacle 164 comprises a plurality of turns and sections that deviate from a linear path. In other words, the wall 165 follows a path that may comprise linear sections, but that makes at least one turn or bend so as to make the totality of the path of the wall 165 between the inlet and outlet non-linear. The elongated internal obstacle 164 and the non-linear path can comprise straight portions (i.e., sections) including straight horizontal portions 166 and straight vertical portions 176 (as viewed in FIG. 2B). The non-linear path can further comprise several turns including forty-five degree turns 168, and ninety degree turns 170, 174. The ninety degree turns 170, 174 can include ninety degree horizontal turns 170 which are turns that are in a horizontal plane that is parallel to the top side 102 and bottom side 104 of the base structure 100, and ninety degree vertical turns 174 which are turns in a plane perpendicular to the horizontal plane. There can be other turns of various angles and directions as desired as well. Further, other features can be incorporated into the elongated internal obstacle 164 to define a non-linear path of the wall 165, such as an increase or a decrease in diameter of the wall 165 forming the circular cross section (i.e., the elongated internal obstacle 164 can comprise a non-uniform cross-section along its length, or at select locations along its length), As another example, if the elongated internal obstacle 164 comprises another cross-sectional shape having multiple walls (e.g., a square cross-sectional shape with walls formed at ninety degrees from one another), at least one of the walls can comprise a non-linear path, such as, for example, a square cross-section transitioning to a rectangular cross-section along a length of the elongated internal obstacle 164.

The elongated internal obstacle 164 can further comprise bypass channels 172. The bypass channels 172 connect between other portions or sections of the elongated internal obstacle 164. In this example, the elongated internal obstacle 164 comprises various portions or sections that are parallel to one another, which is not intended to be limiting in any way. Indeed, the elongated internal obstacle 164 can comprise non-parallel segments, non-linear segments, and any other configuration of segments that can be interconnected via one or more bypass channels. In the example shown, the bypass channels 172 can each be configured to extend between and connect the different parallel sections; thus forming what can be termed short cuts or alternative paths in the elongated internal obstacle 164. In other examples, the bypass channels 172 can be defined by a first split or junction where a single elongated channel splits into two or more elongated channels and a second split or junction where the two or more elongated channels combine back into a single elongated channel, such that the elongated internal obstacle comprises portions or sections with multiple intersecting elongated internal channels between an inlet and an outlet. The bypass channels 172 can comprise any configuration, and can connect any two or more portions or sections of the elongated internal obstacle 164. Moreover, the bypass channels 172 can exist in any number, geometry, size as needed or desired.

The elongated internal obstacle 164 can be configured to extend between an inlet and an outlet formed through one or more sides or surfaces of the base structure 100, or through one or more features or obstacles supported about the base structure 100, thus facilitating fluid and open communication of the elongated internal obstacle 164 with the external, ambient environment. In the example shown, the elongated internal obstacle 164 is configured to extend between an inlet and outlet in the form of openings 178 in the two projecting port holes 122a,b. Each opening 178 forms an inlet or outlet of the elongated internal obstacle 164. Thus, the elongated internal obstacle 164 extends from an inlet to an outlet between the inlet and the outlet, the elongated internal obstacle 164 comprising at least one wall that follows a non-linear path, again, that functions to hinder travel of excess material along a linear path between the inlet and outlet, which excess material exists from an additive manufacturing process used to produce the fabricated additive manufacturing obstacle part.

The elongated internal obstacle 164 can test a manufacturer's ability to form internal features to given specifications. Further, the elongated internal obstacle 164 can test a manufacturers ability to remove excess material from internal features during an additive manufacturing process. Indeed, in some additive manufacturing processes, layers of a powder material can be sintered or bound together to form the various features of a part being produced. The excess powder in each layer must then be removed from the finished part. The elongated internal obstacle 164 tests manufacturer's ability to remove such powder. For example, as opposed to straight through holes, the elongated internal obstacle 164 comprises a nonlinear path increasing the difficulty of clearing out excess powder as the powder is hindered from simply traveling a linear path. Further, the bypass channels 172 increase the difficulty of clearing out excess powder, such as by using air pressure forced through an inlet to an outlet of the elongated internal obstacle 164. Thus, different additive manufacturer's ability to remove excess material in the face of these obstacles can be more accurately tested due to the difficulties presented by the elongated internal obstacle 164. It is noted that, in the example shown, the location within the elongated internal obstacle 164 from which will be the most difficult to remove excess powder will be within the straight vertical portion 176 (see FIG. 2B) as this section is located the greatest distance from the inlets and outlets, with multiple bypass channels 172 between this section and the inlets and outlets.

All of the obstacles and features of the additive manufacturing obstacle part 10 alone or in combination provide different obstacles and operate to test difficulties in additive manufacturing, and thus can provide insight for a person comparing various additive manufacturers. Through testing of an additive manufacturing obstacle part as taught herein and as produced by an additive manufacturer, specifications of the built additive manufacturing obstacle parts of the different additive manufacturers can be obtained. These specifications can be compared to specifications set forth in the template of the additive manufacturing obstacle part 10. In this way a person evaluating different additive manufacturers can objectively select the additive manufacturer with the best capabilities for creating given features. Further, through testing an additive manufacturer's capabilities, one can understand what tolerances and material properties can be expected from a given additive manufacturer. This allows for the design of products with tolerances and properties within the capabilities and constraints of the additive manufacturer.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean nonexclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above, Rather, the specific features and acts described above are disclosed as example forms of implementing the claims. Numerous modifications and alternative arrangements may be devised without departing from the spirit and scope of the described technology.

What is claimed is:

1. An additive manufacturing obstacle part, comprising:
a base structure comprising at least one external obstacle, and at least one internal obstacle that is formed at least partially within the base structure,
wherein the at least one internal obstacle comprises an elongated internal obstacle extending through the base structure between an inlet and an outlet formed in the base structure, wherein the elongated internal obstacle comprises at least one wall extending along a nonlinear path to hinder travel of excess material from an additive manufacturing process along a linear path between the inlet and outlet,
wherein the elongated internal obstacle comprises an elongated channel with straight portions and at least one turn,
wherein the at least one turn forms a U-turn in the elongated channel, and
wherein the elongated internal obstacle comprises at least one bypass channel connecting two or more sections of the elongated internal obstacle.

2. The additive manufacturing obstacle part of claim 1, wherein at least one turn comprises a forty-five degree turn and a ninety degree turn.

3. The additive manufacturing obstacle part of claim 2, wherein the at least one turn comprises a horizontal turn and a vertical turn.

4. The additive manufacturing obstacle part of claim 1, wherein the at least one external obstacle comprises projecting port holes formed on a top side of the base structure, the projecting port holes comprising the inlet and the outlet of the elongated internal obstacle, respectively, and the straight portions of the elongated internal obstacle comprising vertical straight portions disposed within the projecting port holes and horizontal straight portions disposed within the base structure.

5. The additive manufacturing obstacle part of claim 1, wherein the at least one external obstacle comprises an overhang that is cantilevered from a side of the base structure.

6. The additive manufacturing obstacle part of claim 1, wherein the at least one external obstacle comprises a material coupon that facilitates material property testing of the additive manufacturing obstacle part.

7. The additive manufacturing obstacle part of claim 1, wherein the at least one external obstacle comprising an array of through holes extending from a top side to a bottom side, the array of through holes comprising different standard thread diameters, and comprising an array of blind holes extending from the top side into the base structure, the array of blind holes comprising different standard thread diameters.

8. The additive manufacturing obstacle part of claim 1, wherein the at least one external obstacle comprises a surface finish obstacle comprising at least one inclined surface and a vertical surface, the at least one inclined surface and the at least one vertical surface facilitating surface finish testing at different angles on the additive manufacturing obstacle part.

9. The additive manufacturing obstacle part of claim 1, wherein the at least one external obstacle comprises external vertical printing protruding from a side of the base structure, and external horizontal printing protruding from a top of the base structure.

10. The additive manufacturing obstacle part of claim 9, wherein the at least one external obstacle comprises internal vertical printing formed into the side of the base structure, and internal horizontal printing formed into the top of the base structure.

11. The additive manufacturing obstacle part of claim 1, wherein the at least one external obstacle comprises thin wall obstacles formed onto a top of the base structure, the thin wall obstacles comprising different thicknesses.

12. The additive manufacturing obstacle part of claim 1, further comprising an array of vertical holes formed in a side of the base structure, each of the vertical holes comprising a different depth and a different diameter.

13. A method for testing capabilities of an additive manufacturer, comprising:
providing a template of an additive manufacturing obstacle part to the additive manufacturer for fabrication, the additive manufacturing obstacle template configured to facilitate production of an additive manufacturing obstacle part comprising an elongated internal obstacle extending between an inlet and an outlet, wherein the elongated internal obstacle comprises at least one wall extending along a nonlinear path;
receiving a fabricated additive manufacturing obstacle part from the additive manufacturer based on the template;
evaluating the fabricated additive manufacturing obstacle part against the template of the additive manufacturing obstacle part by comparing one or more specifications of the fabricated additive manufacturing obstacle part with one or more specifications of the template of the additive manufacturing obstacle part; and
measuring an amount of excess material remaining in the elongated internal obstacle to determine the additive manufacturer's ability to remove the excess material from internal features.

14. The method of claim 13, further comprising measuring surface finish of at least a portion of the fabricated obstacle part.

15. The method of claim 13, further comprising measuring one or more of thermal conductivity, outgas sing, coefficient of thermal expansion, specific heat, density, and microstructure of at least a portion of the fabricated obstacle part.

16. The method of claim 13, further comprising measuring tensile strength of at least a portion of the fabricated obstacle part.

17. An additive manufacturing obstacle part, comprising:
a base structure comprising at least one external obstacle, and at least one internal obstacle that is formed at least partially within the base structure,
wherein the at least one internal obstacle comprises an elongated internal obstacle extending through the base structure between an inlet and an outlet, the elongated internal obstacle comprising a wall that travels a nonlinear path along the length of the elongated internal obstacle, and
wherein the elongate internal obstacle is operable to hinder travel of excess material from an additive manufacturing process along a linear path between the inlet and outlet,
wherein the elongated internal obstacle comprises at least one bypass connecting at least two sections of the elongated internal obstacle.

18. The additive manufacturing obstacle part of claim 17, wherein the elongated internal obstacle comprises an elongated channel with one or more horizontal straight portions, one or more vertical straight portions, and one or more turns.

19. The additive manufacturing obstacle part of claim 17, wherein the at least one external obstacle comprises projecting port holes formed on a top side of the base structure, the projecting port holes comprising the inlet and the outlet of the elongated internal obstacle, respectively.

20. An additive manufacturing obstacle part, comprising:
a base structure comprising at least one external obstacle, and at least one internal obstacle that is formed at least partially within the base structure,
wherein the at least one internal obstacle comprises an elongated internal obstacle extending through the base structure between an inlet and an outlet formed in the base structure, wherein the elongated internal obstacle comprises at least one wall extending along a nonlinear path to hinder travel of excess material from an additive manufacturing process along a linear path between the inlet and outlet,
wherein the at least one external obstacle comprises projecting port holes formed on a top side of the base structure, the projecting port holes comprising the inlet and the outlet of the elongated internal obstacle, respectively, and the straight portions of the elongated internal obstacle comprising vertical straight portions disposed within the projecting port holes and horizontal straight portions disposed within the base structure.

* * * * *